(12) United States Patent
Shoji

(10) Patent No.: US 6,404,168 B1
(45) Date of Patent: Jun. 11, 2002

(54) AUXILIARY BATTERY FOR PORTABLE DEVICES

(75) Inventor: Hideki Shoji, Iwaki (JP)

(73) Assignee: Toyo System Co., Ltd., Fukushima (JP)

( * ) Notice: Subject to any disclaimer, the term of this patent is extended or adjusted under 35 U.S.C. 154(b) by 0 days.

(21) Appl. No.: 09/944,428

(22) Filed: Aug. 31, 2001

(51) Int. Cl.[7] .............................................. H01M 10/46
(52) U.S. Cl. ...................................... 320/134; 307/66
(58) Field of Search ................................. 320/103, 110, 320/116, 117, 132, 134, 135; 307/66, 64, 65, 70

(56) References Cited

U.S. PATENT DOCUMENTS 4,480,298 A * 10/1984 Fry
4,604,530 A * 8/1986 Shibuya
5,537,390 A * 7/1996 Horiba et al.

* cited by examiner

Primary Examiner—Edward H. Tso
(74) Attorney, Agent, or Firm—Muramatsu & Associates

(57) ABSTRACT

An auxiliary battery for portable devices that can be used for a variety of applications with high power capacity. The auxiliary battery includes a power input section for receiving electric power from an external power source, a power storage section having a secondary battery for receiving a charge current from the power input section, a power output section having one or more output terminals for producing electric power at output terminals, and an power switch circuit for selectively inputting electric power to the power output section either from the power input section or from the power storage section.

11 Claims, 3 Drawing Sheets

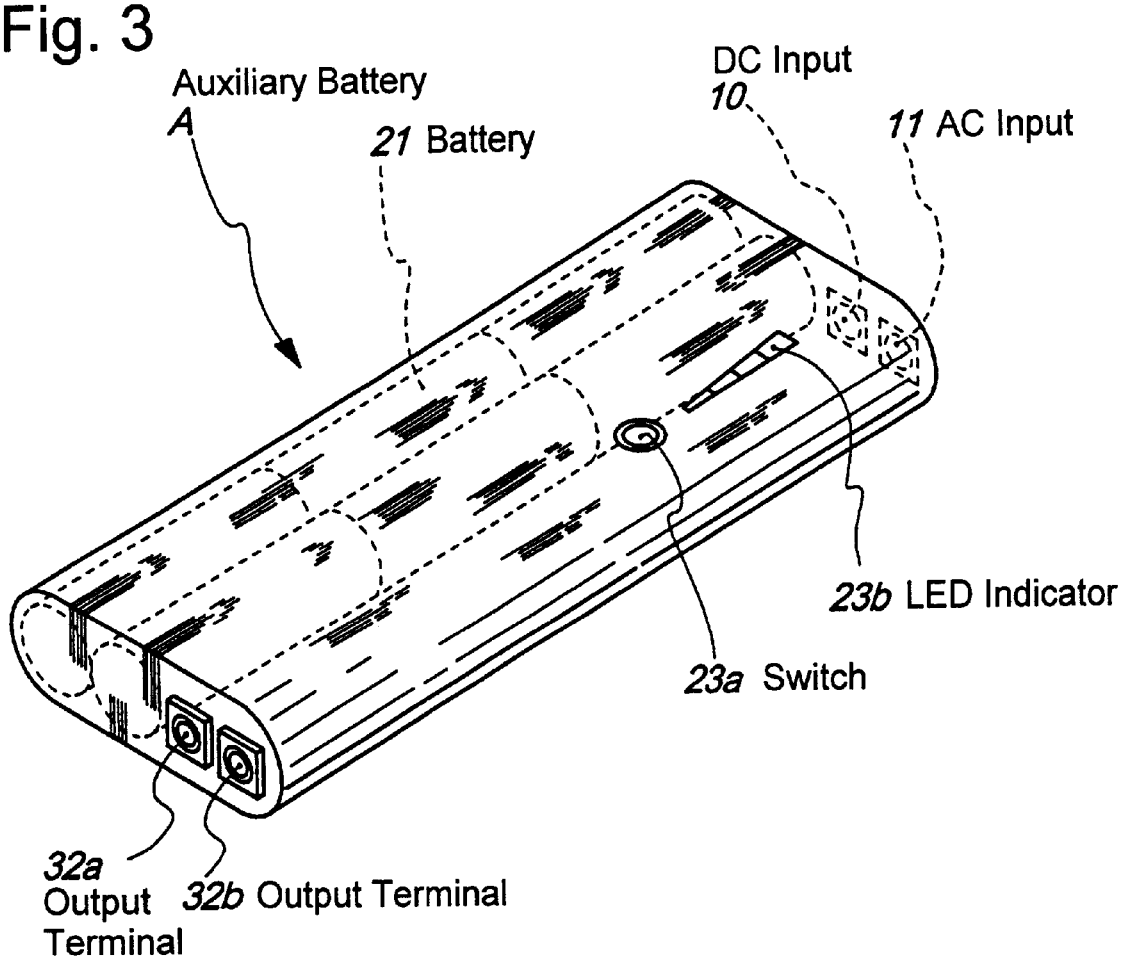

AUXILIARY BATTERY FOR PORTABLE DEVICES

BACKGROUND OF THE INVENTION

1. Field of the Invention

This invention relates to an auxiliary battery for portable devices, and more particularly, to an auxiliary battery that can be used for a variety of applications with high electric capacity.

2. Description of the Related Art

Because of the rapid growth of portable devices, a large number of secondary batteries are produced such as lithium ion batteries as internal power sources. Since there are many different types of portable devices, such as notebook PCs (personal computers), cellular phones, audio/video devices and the like, battery voltages in such devices are sometimes different from one another.

Further, because of high demand for such batteries implemented in portable devices to be small and lightweight, batteries suffer from limitation of the size. Therefore, it is difficult to produce a battery with a sufficient length of operating time that can satisfy consumers. Therefore, some device makers produce high capacity batteries that are specific to a particular type of portable devices to fulfill the insufficiency of the power capacity.

On the other hand, a general purpose auxiliary battery that is able to output different voltages is also available in the market. Such an auxiliary battery has voltage terminals for different voltages so as to be used for portable devices with different operating voltages.

However, because the high capacity battery noted above is specifically made for particular portable devices, it can not be used on different types of portable devices. Therefore, it is necessary to prepare specialized batteries and a battery charger for each portable device.

The general purpose auxiliary battery noted above can be implemented on portable devices that have different operating voltages. However, there are various performance limitations in such auxiliary batteries such as not being able to use the portable device while charging the battery, or multiple voltage output terminals cannot be used at the same time. Therefore, the conventional batteries are not convenient enough for present day portable devices.

SUMMARY OF THE INVENTION

It is, therefore, an object of the present invention to provide an auxiliary battery for portable devices that can solve the problems involved in the conventional batteries.

It is another object of the present invention to provide an auxiliary battery that is capable of charging the electric power therein while operating a portable device.

It is a further object of the present invention to provide an auxiliary battery which is capable of monitoring the modes of power input to the auxiliary battery and selectively providing the output electric power to the portable device from an external power source such as commercial AC power source or from the inner secondary batteries in the auxiliary battery.

To achieve the above objectives, one aspect of the auxiliary battery of the present invention for portable devices is comprised of a power input section for receiving electric power either from an external direct current power source or a direct current power source converted from an external alternating current power source, a power storage section having a secondary battery for receiving a charge current from the power input section, a power output section having one or more output terminals determined by power requirements of portable devices for producing electric power at the output terminals, and an input power switch circuit for selectively inputting electric power to the power output section either from the power input section when the electric power is available therefrom or from the power storage section when the electric power is unavailable from the power input section.

In another aspect of the present invention, the auxiliary battery for portable devices further includes an output power switch for outputting electric power to the output power section while supplying surplus power to the power storage section for charging the secondary battery.

In a further aspect of the present invention, the auxiliary battery for portable devices further includes a protection circuit for protecting the secondary battery by terminating a charge or discharge operation or disconnecting a charge or discharge circuit when abnormal voltage and/or temperature is detected in the secondary battery.

In a further aspect of the present invention, the auxiliary battery for portable devices further includes an output control circuit for producing a plurality of power outputs at the output terminals at the power output section with voltages different from one another.

In a further aspect of the present invention, the auxiliary battery for portable devices further includes an indicator for showing a remaining level of power in the secondary battery.

According to the present invention, the auxiliary battery ordinarily provides the DC power produced from the external DC or AC power source to the portable device. When the supply of power from the external source is unavailable, the auxiliary battery can provide the power required for the portable device from the secondary battery. When the power from the external source is supplied to the portable device, the auxiliary battery is able to charge the secondary battery with use of the surplus power.

The auxiliary battery is able to protect the secondary battery by terminating a charge or discharge operation or disconnecting a charge or discharge circuit when abnormal voltage and/or temperature is detected in the secondary battery. Further, auxiliary battery of the present invention produces a plurality of power outputs with different voltages. The auxiliary battery is able to show the remaining level of power in the secondary battery.

BRIEF DESCRIPTION OF THE DRAWINGS

FIG. 3 is a perspective view showing an example of outside appearance of the auxiliary battery implemented on the preferred embodiment of the present invention.

DESCRIPTION OF THE INVENTION

Figure 1:
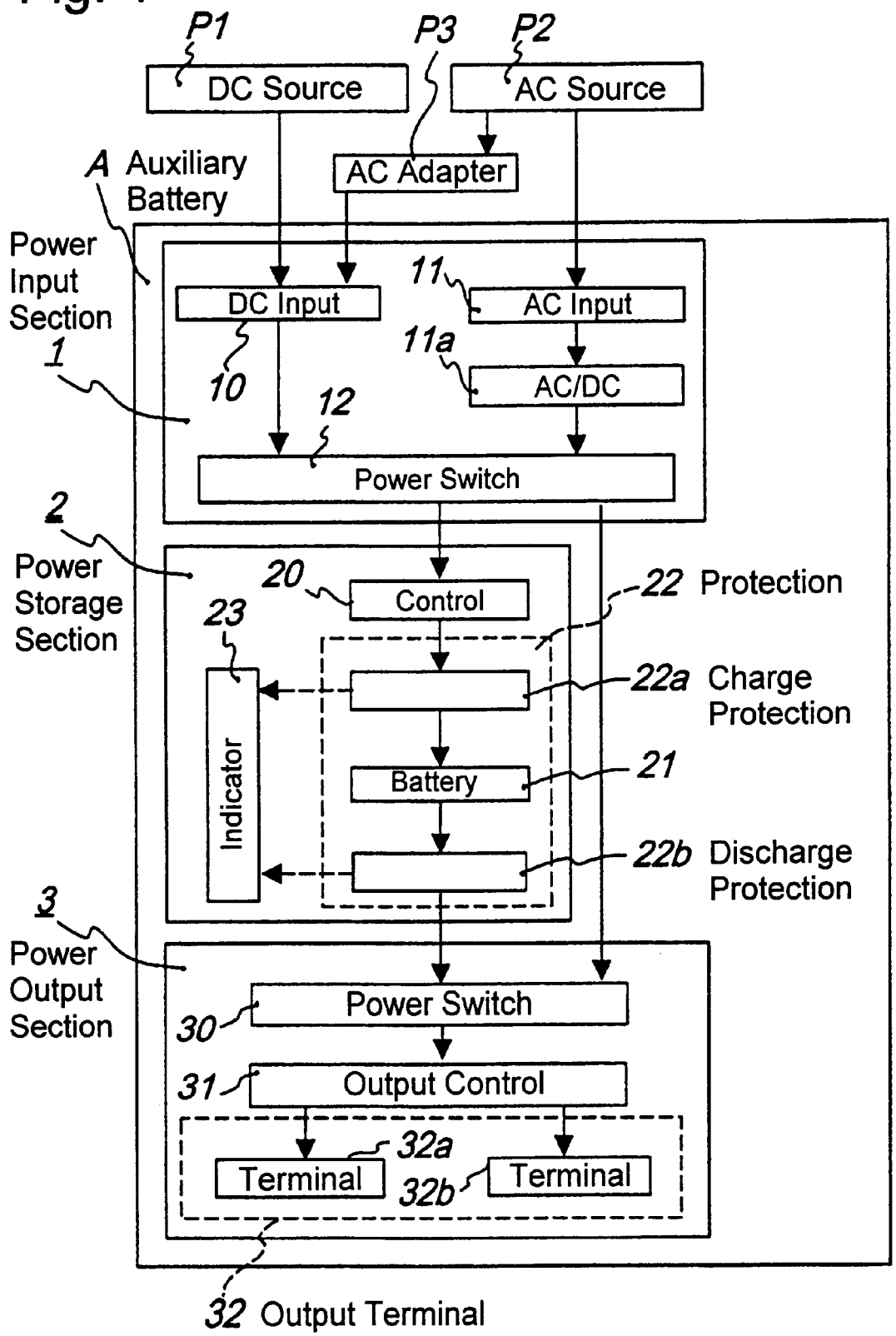
FIG. 1 is a block diagram showing an example of structure in an auxiliary battery in the preferred embodiment of the present invention.
Figure 2:
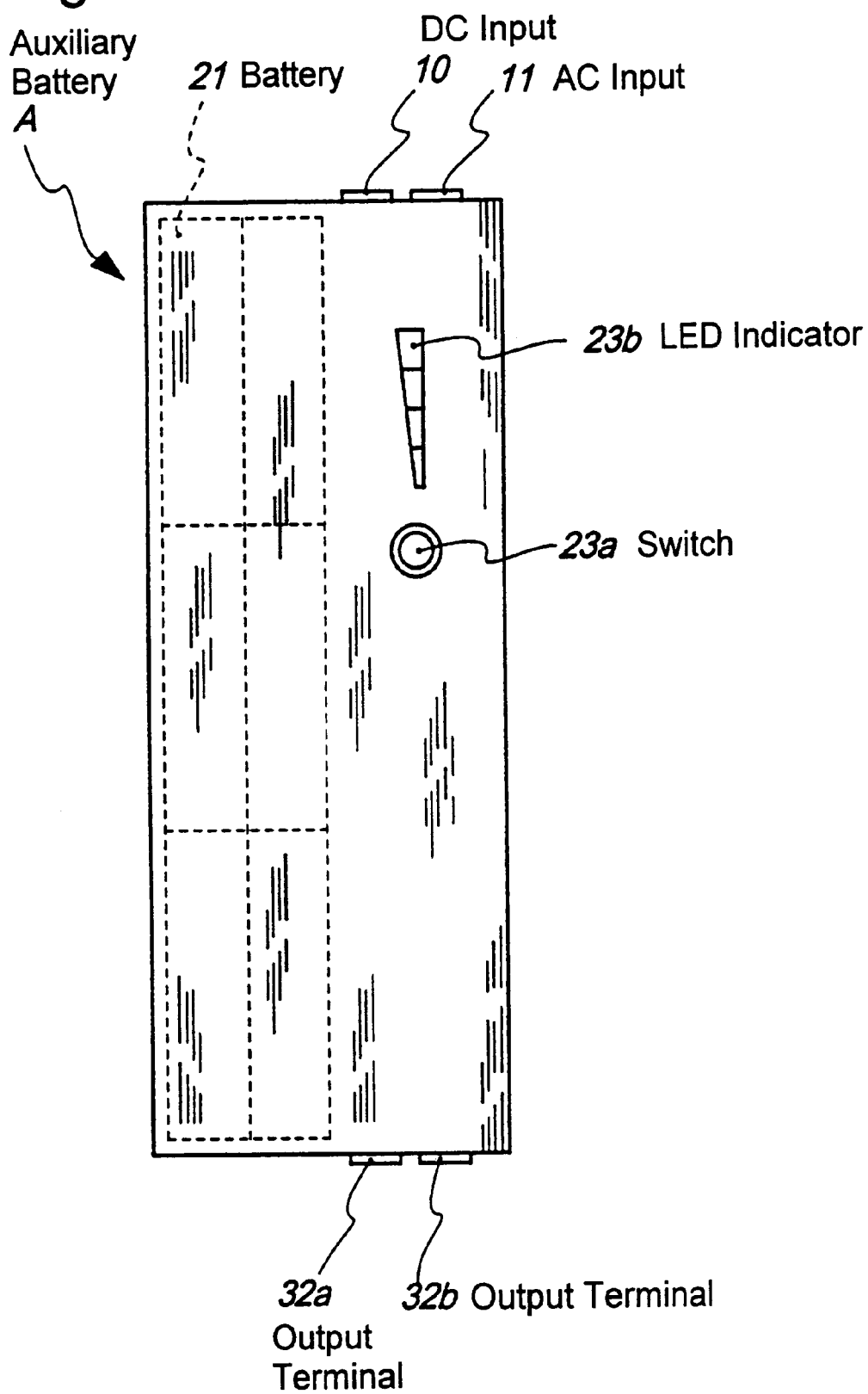
FIG. 2 is a plan view showing an outside appearance of the auxiliary battery implemented on the preferred embodiment of the present invention.

Detailed descriptions of the auxiliary battery of the present invention for portable devices is given below with reference to the drawings. FIG. 1 is a block diagram showing an example of configuration of the auxiliary battery of the present invention. FIG. 2 is a top view of the preferred embodiment of the present invention, and FIG. 3 is a perspective view showing an example of outer appearance of the auxiliary battery of FIG. 2.

In the embodiment of FIG. 1, an auxiliary battery A for portable devices (hereinafter "auxiliary battery"), is comprised of a power input section 1, a power storage section 2, and a power output section 3.

As shown in the block diagram of FIG. 1, the power input section 1 provides the electric power from the external power sources to the power output section 3 and/or power storage section 2. The power input section 1 includes a direct current (DC) input terminal 10 and an alternating current (AC) input terminal 11, and an output power switch circuit 12.

The direct current input terminal 10 receives direct current (DC) electric power with a voltage range of, for example, 3–24V from an outside sources. Examples of such direct current outside sources include a direct current power source P1 such as from an automobile cigarette lighter socket and an AC (alternating current) adapter P3 specially made for portable devices which is connected to an alternating current power source P2 such as a commercial power source.

The alternating current )AC) input terminal 11 receives alternating current electric power with a voltage range of, for example, 100–240V supplied from the alternating current (AC) power source P2 such as domestic or foreign alternating current power sources. The alternating current (AC) electric power that is input to the alternating current input terminal 11 is converted to a direct current (DC) electric power by an AC/DC converter circuit 11a. Thus, the AC/DC converter circuit 11a produces the direct current power.

The output power switch circuit 12 is a circuit that provides the DC power received from the direct current (DC) input terminal 10 or from the alternating current (AC) input terminal 11 (the AC/DC converter circuit 11a) to an input power switch circuit 30 in the power output section 3. At the same time, the output power switch circuit 12 provides the excess power, that occurred when supplying the power to the input power source switch circuit 30, to the power storage section 2.

It is so designed that the output power switch circuit 12 gives priority to the input power switch circuit 30 over the power storage section 2 in supplying the power. Therefore, when a portable device is connected to the power output section, the power is supplied to the power switch circuit 30 to drive the portable device. However, when there is nothing connected to the power output section 3, the DC electric power from the power input section 1 is used to charge the power storage section 2.

The power storage section 2 is provided between the power input section 1 and the power output section 3 and stores the electric power by charging the excess power in a secondary battery therein. The power storage section 2 is mainly comprised of a charge control circuit 20, a battery pack (secondary battery) 21, and a protection circuit 22.

The charge control circuit 20 controls a charge operation of the battery pack 21 by converting or adjusting the charge conditions to be suitable for charging the battery pack 21 by the power received from the output power switch circuit 12 of the power input section 1. The charge conditions include adjustment and control of charge voltage and current, start control of the charge operation, and a stop control after detection of full charge, etc.

The battery pack 21 stores the electric power by charging the power from the power input section 1 which is surplus power when providing the power to the power output section 3. When the power supplied to the power output section 3, i.e., a portable device, is insufficient, the battery pack 21 provides supplemental power to the input power switch circuit 30 of the power output section 3 through the protection circuit 22.

The protection circuit 22 includes a charge protection circuit 22a and a discharge protection circuit 22b. As shown in FIG. 1, the battery pack 21 is connected between the charge protection circuit 22a and the discharge protection circuit 22b. The protection circuit is arranged between the output power switch circuit 12 of the power input section 1 and the input power switch circuit 30 of the power output section 3.

As an example, the battery pack 21 implemented on the preferred embodiment utilizes three series connected blocks of type 18650 lithium ion batteries where each block is configured by two batteries connected in parallel. Also as an example, the overall capacity of the battery pack 21 configured as noted above is 3300 mAH.

The protection circuit 22 is a circuit to improve the safety of the auxiliary battery of the present invention by disconnecting a circuit or terminating the charge and discharge operation of the battery pack 21 when an abnormal voltage or temperature is detected. As noted above, the protection circuit 22 is comprised of the charge protection circuit 22a and the discharge protection circuit 22b.

The charge protection circuit 22a is provided between the charge control circuit 20 and the battery pack 21. The charge protection circuit 22a terminates the charge operation or disconnects the charge circuit when detecting any abnormalities in charging the battery pack 21 such as over charging or temperature increase. The discharge protection circuit 22b is provided between the battery pack 21 and the input power switch circuit 30. The discharge protection circuit 22b terminates the discharge operation or disconnects the discharge circuit when detecting any abnormalities in discharging the battery pack 21 such as over discharging or temperature increase.

The charge protection circuit 22a and the discharge protection circuit 22b accumulate the current and voltage during the charge and discharge operation of the battery pack 21, which is provided to a capacity indicator 23. By operating a switch 23a (FIG. 2), the capacity indicator 23 displays a remaining capacity in the battery pack 21. For example, in FIG. 2, the capacity indicator 23 is configured by an LED indicator 23b which displays the remaining capacity in different levels.

The power output section 3 is comprised of the input power switch circuit 30, and an output control circuit 31, and an output terminal unit 32. The power output section 3 outputs the electric power received from the power input section 1 or from the power storage section 2 to the portable device (not shown).

The input power switch circuit 30, during a normal mode, provides the electric power from the external power source from the output power switch circuit 12 to the output control circuit 31. However, when the supply of electric power through the output power switch circuit 12 is stopped or insufficient due to, for example, the power failure in the external power source, the battery pack 21 supplies additional power to the output control circuit 31.

The output control circuit 31 provides the electric power to the output terminal unit 32 according to the voltage and current conditions specified by the output terminal unit 32. Moreover, to be able to use multiple output terminals at the same time, a DC/DC converter is implemented for each output terminal.

The output terminal unit 32 establishes output terminals to be connected to the portable device. In the preferred embodiment, it is configured with two output terminals 32a and 32b. The output terminal 32a provides a high output voltage selected out of, for example, 12V, 15V, and 19V. The output terminal 32b provides a low output voltage selected out of, for example, 3V, 5V, and 7.5V.

A connection cable (not shown) is provided between the output terminal 32a or 32b and the portable device (not shown). The end of the connection cable at the side of the portable device is preferably branched into two or more cables (not shown) corresponding to the output voltage levels, thereby enabling to choose one of the voltages according to a DC input voltage required for the specific portable device. In this manner, the input DC voltage required for the portable device can be output through the output control circuit 31.

The result of the experiment of the auxiliary battery of the present invention is briefly described here. First, the auxiliary battery received 100V AC electric power from the commercial alternating current (AC) power source P2 through the AC input terminal 11. After confirming the full-charge of the battery pack 21 using the LED indicator 23b, the auxiliary battery was disconnected from the AC power source P2 and the output terminal 32a was connected to a notebook PC that utilizes a 12V/3300 mAH internal battery. An operable time length of the notebook PC using only the internal battery was 1.5 hours, however, by using both the auxiliary battery of the present invention and the internal battery of the notebook PC, the operable time was increased to 3 hours.

Further, the auxiliary battery with fully charged battery pack 21 that was disconnected from the commercial AC power source was implemented on a mobile (cellular) phone that utilizes a 4V/660 mAH internal battery pack through the output terminal 32b. An operable time of the cellular phone using only the internal battery was 120 hours, however by using both the auxiliary battery of the present invention and the internal battery of the cellular phone, the operable time was increased to 800 hours.

Further, when the remaining capacity of the battery pack 21 of the auxiliary battery was small, the AC adapter P3 for the notebook PC plugged into the commercial AC power source P2 was connected to the DC input terminal 10 and the output terminal 32a of the auxiliary battery was connected to the notebook PC. As result of this arrangement, the notebook PC was able to continuously operate, and at the same time, it was confirmed through the LED indicator 23 that the battery pack 21 in the auxiliary battery was being charged.

Moreover, by connecting the output terminal 32a of the auxiliary battery to the notebook PC and by connecting the output terminal 32b to the cellular phone while operating the notebook PC, it was confirmed that the battery in the cellular phone was charged at the same time.

In the foregoing embodiment, because the auxiliary battery is intended to be used for portable devices, lithium ion batteries each having a high energy density is implemented in the battery pack 21 as a secondary battery. However, other types of lithium based secondary batteries such as lithium polymer batteries or nickel hydrogen batteries can also be used.

In the foregoing embodiment, although the protection circuit 22 is implemented to prevent the battery pack 21 from the over charge and/or over discharge, such a protection circuit is not an absolutely necessary part for the purpose of this invention, and thus can be eliminated. Moreover, the protection circuit 22 may be replaced with a lamp indicator or a beep-sounding device, in addition to the capacity indicator 23, to notify the abnormalities associated with the battery pack 21 to the user.

Furthermore, the number of output terminals 32 is not limited to the example in the foregoing, but three or more output terminals can be implemented. Similarly, the voltage levels at the output terminals for portable devices are not limited to the example in the foregoing but other voltage levels can also be implemented. The setting of the output voltage for a particular device can be performed with use of a voltage change-over switch (not shown) that is implemented on the auxiliary battery, or by preparing different connection cables for each output voltage levels and selectively using one of the connection cables to provide for a particular voltage from the output terminal 32.

The auxiliary battery of the present invention can significantly increase the operable time of portable devices such as a notebook PC, cellular phone, or PDAs such as palm computers. The auxiliary battery is designed to match the commercial power sources in Japan, United States of America, and European and Asian countries. Thus, it can be used during a trip not only within Japan but also in foreign countries as well. Further, since the auxiliary battery of the present invention can be utilized on most of the commercial power sources in foreign countries as noted above, it can be used as a voltage conversion device when the user is in a foreign country.

Further, the auxiliary battery of the present invention makes it unnecessary to bring around different auxiliary batteries for different portable devices. The auxiliary battery enables to use two or more portable devices at the same time even when there is no commercial power source available. Moreover, by implementing the auxiliary battery between the commercial power source and the portable device, it is possible to operate the portable device while the auxiliary battery is being charged.

Furthermore, when there is an unexpected power failure of the commercial power source or when there is an unpredicted disconnection in a power cable or connector, danger of data loss during operation can be avoided by using the electric power provided from the auxiliary battery, thereby maintaining the performance of the portable device. Also, since the voltage of the entire battery pack comprising the auxiliary battery is converted through the DC/DC converter, the power consumption in each battery is the same, which increases a battery life as well as cost/performance. Moreover, the charge and discharge operations are controlled by the charge control circuit and the output control circuit, which also increases a battery life and an overall cost/performance of the auxiliary battery.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. An auxiliary battery for portable devices, comprising:
   a power input section for receiving electric power either from an external direct current power source or a direct current power source converted from an external alternating current power source;
   a power storage section having a secondary battery for receiving a charge current from said power input section;

a power output section having one or more output terminals determined by power requirements of portable devices for producing electric power at said output terminals; and an input power switch circuit for selectively inputting electric power to said power output section either from said power input section when the electric power is available therefrom or from said power storage section when the electric power is unavailable from said power input section.

2. An auxiliary battery for portable devices as defined in claim 1, further comprising an output power switch for outputting electric power to said output power section while outputting surplus power to said power storage section for charging said secondary battery.

3. An auxiliary battery for portable devices as defined in claim 1, further comprising a protection circuit for protecting said secondary battery by terminating a charge or discharge operation or disconnecting a charge or discharge circuit when abnormal voltage and/or temperature is detected in said secondary battery.

4. An auxiliary battery for portable devices as defined in claim 2, further comprising a protection circuit for protecting said secondary battery by terminating a charge or discharge operation or disconnecting a charge or discharge circuit when abnormal voltage and/or temperature is detected in said secondary battery.

5. An auxiliary battery for portable devices as defined in claim 1, further comprising an output control circuit for producing a plurality of power outputs at said output terminals in said power output section with voltages different from one another.

6. An auxiliary battery for portable devices as defined in claim 2, further comprising an output control circuit for producing a plurality of power outputs at said output terminals in said power output section with voltages different from one another.

7. An auxiliary battery for portable devices as defined in claim 3, further comprising an output control circuit for producing a plurality of power outputs at said output terminals in said power output section with voltages different from one another.

8. An auxiliary battery for portable devices as defined in claim 1, further comprising an indicator for showing remaining power in said secondary battery.

9. An auxiliary battery for portable devices as defined in claim 2, further comprising an indicator for showing remaining power in said secondary battery.

10. An auxiliary battery for portable devices as defined in claim 3, further comprising an indicator for showing remaining power in said secondary battery.

11. An auxiliary battery for portable devices as defined in claim 4, further comprising an indicator for showing remaining power in said secondary battery.

* * * * *